(12) United States Patent
Kazmi et al.

(10) Patent No.: US 8,352,822 B2
(45) Date of Patent: Jan. 8, 2013

(54) METHOD AND ARRANGEMENT RELATING TO COMMUNICATIONS NETWORK

(75) Inventors: Muhammad Kazmi, Bromma (SE); Jingyi Liao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 403 days.

(21) Appl. No.: 12/596,509

(22) PCT Filed: Apr. 30, 2008

(86) PCT No.: PCT/EP2008/003534
§ 371 (c)(1),
(2), (4) Date: Oct. 19, 2009

(87) PCT Pub. No.: WO2008/131971
PCT Pub. Date: Nov. 6, 2008

(65) Prior Publication Data
US 2010/0146358 A1    Jun. 10, 2010

(30) Foreign Application Priority Data
Apr. 30, 2007 (SE) ........................ 0701042

(51) Int. Cl.
*G06F 11/00* (2006.01)
(52) U.S. Cl. ........................ 714/748; 714/749
(58) Field of Classification Search ........... 714/748–751
See application file for complete search history.

(56) References Cited

U.S. PATENT DOCUMENTS

| | | | |
|---|---|---|---|
| 7,339,949 B2 | 3/2008 | Suzuki et al. | |
| 2004/0136349 A1 | 7/2004 | Walton et al. | |
| 2005/0147023 A1 | 7/2005 | Stephens | |
| 2005/0251721 A1* | 11/2005 | Ramesh et al. | 714/748 |
| 2005/0276266 A1* | 12/2005 | Terry | 370/394 |
| 2007/0223422 A1* | 9/2007 | Kim et al. | 370/334 |
| 2007/0245201 A1* | 10/2007 | Sammour et al. | 714/748 |
| 2007/0255993 A1* | 11/2007 | Yap et al. | 714/748 |
| 2008/0059859 A1* | 3/2008 | Marinier et al. | 714/748 |
| 2008/0225822 A1* | 9/2008 | Zhang et al. | 370/343 |
| 2008/0233964 A1* | 9/2008 | McCoy et al. | 455/450 |
| 2008/0273610 A1* | 11/2008 | Malladi et al. | 375/260 |
| 2009/0022098 A1* | 1/2009 | Novak et al. | 370/329 |
| 2009/0116434 A1* | 5/2009 | Lohr et al. | 370/329 |
| 2010/0110878 A1* | 5/2010 | Frederiksen et al. | 370/216 |
| 2010/0238870 A1* | 9/2010 | Mitra et al. | 370/329 |

FOREIGN PATENT DOCUMENTS

| | | | |
|---|---|---|---|
| EP | 1263168 A | 12/2002 | |
| EP | 1662712 A | 5/2006 | |
| JP | 2003-179581 | 6/2003 | |

(Continued)

OTHER PUBLICATIONS

International Search Report for PCT/EP2008/003534 dated Oct. 9, 2008.

(Continued)

*Primary Examiner* — Marc Duncan
(74) *Attorney, Agent, or Firm* — Potomac Patent Group PLLC

(57) ABSTRACT

The invention relates to a method in a radio base station and user equipment, and comprises varying the transmitted timings of the HARQ feedback signaling such that only users with orthogonal pre-coding vectors (W) are scheduled simultaneously, to reduce multi-user interference and to ensure that said signaling is received by a transmitter before the start of the next retransmission.

33 Claims, 3 Drawing Sheets

FOREIGN PATENT DOCUMENTS

| WO | 2005015848 A | 2/2005 |
|----|--------------|--------|
| WO | 2006/102469 A1 | 9/2006 |

OTHER PUBLICATIONS

International Preliminary Report on Patentability for PCT/EP2008/003534 dated Jun. 23, 2009.

Wei, N., et al., "Performance of MIMO with Frequency Domain Packet Scheduling in UTRAN LTE Downlink," Vehicular Technology Conference, 2007, IEEE, Apr. 1, 2007, XP031092815, pp. 1177-1181.

IEEE Standard 802.16-2004 "IEEE Standard for Local and metropolitan area networks; Part 16: Air Interface for Fixed Broadband Wireless Access Systems", IEEE Computer Society and IEEE Microwave Theory and Techniques Society, Oct. 1, 2004, pp. 1-892.

LG Electronics; "Consideration on control signalling for MIMO-HARQ in E-UTRA downlink"; 3rd Generation Partnership Project (3GPP) TSG RAN WG1 Meeting #48bis; R1-071556; Mar. 26-30, 2007; pp. 2-6/E; St. Julians, Malta.

* cited by examiner

METHOD AND ARRANGEMENT RELATING TO COMMUNICATIONS NETWORK

RELATED APPLICATIONS

This application claims priority and benefit from International Application No. PCT/EP2008/003534, filed Apr. 30, 2008, which claims priority to Swedish patent application No. 0701042-4, filed Apr. 30, 2007, the entire teachings of which are incorporated herein by reference.

TECHNICAL FIELD

The present invention relates to methods and arrangements in a communications network, especially in MIMO networks.

BACKGROUND OF THE INVENTION

One existing mobile communications network is a UMTS Terrestrial Radio Access Network (UTRAN), and a development of this is the Evolved UTRAN (E-UTRAN) network. In the downlink, an E-UTRAN network will support several multiple input multiple output (MIMO) schemes including multi-user (MU) MIMO techniques. The MU-MIMO technologies have also been widely adopted in other future wireless communication standards e.g., IEEE P802.16-REVd/D5-2004, "Part 16: Air Interface for Fixed Broadband Wireless Access Systems". Furthermore MIMO schemes can be used in both uplink and downlink. The UTRAN system will also employ a hybrid automatic repeat request (HARQ) scheme, either asynchronous or synchronous (S-HARQ) either in the uplink or downlink or in both directions. The HARQ operation should work in conjunction with the MU-MIMO in either direction while meeting the requirements of HARQ process and at the same time fulfilling any MU-MIMO relation conditions.

As is well known, the term MIMO implies that both the base station and the User Equipment (UE) have multiple antennas. MIMO then provides different spatial processing which has the potential to contribute significantly to improve spectral efficiency, diversity, coverage, interference mitigation, etc. MIMO modes or techniques can be categorized in a number of different ways. One type of classification is based on whether users can be served simultaneously or not. As this type of classification is more relevant to this invention, therefore the following two types of MIMO modes are described in more detail:

Single user MIMO
Multi-user MIMO

In a single user (SU) MIMO scheme all MIMO streams are assigned to a single user at a time. This means a user can achieve very high peak data rate. However, this approach is feasible when a single user has sufficient data traffic in its buffer at the base station and all the MIMO streams exhibit sufficiently good channel quality. Typically single user MIMO provides higher gain in less dispersive channel environment.

In a multi-user (MU) MIMO scheme several UEs are assigned the same resource block(s) on different MIMO streams at a time. This scheme is more useful when there is large number of simultaneous active users in the system and they don't require very high peak data rate. The obvious solution is to share the downlink resources among these active users. MU-MIMO provides higher performance gain compared to the SU-MIMO at higher system load. MU-MIMO is also more flexible especially with respect to delay sensitive services since several users can be scheduled at the same time.

However, simultaneous transmission requires that orthogonality conditions between the users to be scheduled are fulfilled as described further below.

The base station has to simultaneously schedule UEs in such a way that multi-user interference is minimized. Otherwise the potential gain of MU-MIMO could be lost. Thus, the UEs with orthogonal pre-coding vectors (W) are scheduled simultaneously to reduce multi-user interference. There is then a performance gain for scheduled users with orthogonal beams over the users without orthogonal beams.

The orthogonality conditions can be explained further in a case where:

W1 is orthogonal pre-coding vector for UE1
W2 is orthogonal pre-coding vector for UE2
W3 is orthogonal pre-coding vector for UE3
IF $$W1*W2'=0, W1*W3'\neq 0$$

Then
UE1 and UE2 can be scheduled simultaneously
UE3 cannot be scheduled with UE1 and UE2 simultaneously In other words some UE could not send until the orthogonality condition is satisfied, e.g. pre-coding vector orthogonal to other schedule UEs.

The most common technique for error detection of non-real time services is based on Automatic Repeat reQuest (ARQ) schemes, which are combined with Forward Error Correction (FEC), called Hybrid ARQ. A hybrid automatic repeat request (HARQ) protocol performs both backward and forward error correction of the transmitted packets. The backward error correction is characterized by the retransmission of the packets or HARQ protocol data unit (HARQ PDU) by the transmitter in response to the reception of negative acknowledgement (NACK) from the receiver. The forward error correction is performed at the receiver by making use of the redundancy and the retransmitted packets or PDU.

The hybrid ARQ (HARQ) can be either synchronous or asynchronous. For both asynchronous and synchronous HARQ, it is assumed that the ACK/NAK signalling is synchronous. The difference of both schemes lies in the timing relationship of retransmissions. For a synchronous concept, the retransmission is performed at a pre-specified time-instance while in the asynchronous case the time of the retransmission is determined by the scheduler and is in general not known by the receiver. The timing relationship of (re)transmission and feedback signalling, e.g. ACK/NACK for synchronous HARQ is explained as below in detail.

FIG. 1 illustrates the synchronous HARQ (S-HARQ) operation, showing transmissions from the base station (BS) and user equipment (UE1) in a mobile communication network.

Data packets (Block 1.1, Block 2.1, Block 3.1) are sent in order, and the user equipment sends either an acknowledgement (ACK) of successful reception of the relevant packet, or an indication (NACK) that the packet has not successfully been received. In the event of unsuccessful reception, the base station retransmits the packet (Block 1.2). This retransmission occurs at a pre-scheduled instant, e.g. at a time T1 after the original transmission.

Hence there is a fixed time between transmissions and retransmissions.

On the other hand in case of asynchronous HARQ, there are no fixed timing relations between the transmissions and retransmissions.

The synchronous HARQ operation can be employed both in the downlink and uplink. In the case of the downlink synchronous HARQ protocol, as shown in FIG. 2, the packets (Block 1.1) are transmitted by the base station (BS) and the acknowledgement (ACK) and negative acknowledgement (NACK) are sent by the UE on the uplink control channel.

As mentioned above, there is a fixed retransmission duration, indicated by T1 in FIG. 2. The time taken for UE1 to receive an HARQ protocol data unit (PDU) from the base station BS is indicated by T2 in FIG. 2, and T3 indicates the duration of uplink scheduling (for ACK/NACK) for UE1.

Thus, in order for the S-HARQ to work successfully, the base station has to receive the ACK/NACK message before the fixed retransmission duration expires, i.e.:

$$T1 > T2 + T3.$$

Any other UE feedback needed for link adaptation, e.g. a channel quality indicator (CQI), code book, etc should also be available before the expiry of T1.

In the case of the uplink synchronous HARQ protocol, as shown in FIG. 3, the packets (Block 1.1) are transmitted by the user equipment UE1 and the acknowledgement (ACK) and negative acknowledgement (NACK) messages are sent by the base station BS on the downlink control channel.

As above, there is a fixed retransmission duration, indicated by T1 in FIG. 3. The time taken for BS to receive an HARQ protocol data unit (PDU) from UE1 is indicated by T2 in FIG. 3, and T3 indicates the duration of downlink scheduling (for ACK/NACK) to UE1.

Thus, in order for the S-HARQ to work successfully, the UE has to receive the ACK/NACK message before the fixed retransmission duration expires, i.e.:

$$T1 > T2 + T3.$$

In WCDMA synchronous HARQ is used in the uplink, i.e. for enhanced uplink (EUL) transmission. But asynchronous HARQ is used in the downlink, i.e. for high speed downlink packet access (HSDPA) transmission.

In E-UTRAN the current working assumption is to follow the same approach as in WCDMA. This means S-HARQ will be used in the uplink and asynchronous HARQ will be used for downlink packet transmission.

In addition MU-MIMO will be used at least in the downlink of E-UTRAN even in the early phase of standardization. Thus the combination of DL MU-MIMO and UL S-HARQ needs to work properly while retaining their benefits.

In E-UTRAN the discontinuous reception (DRX) and discontinuous transmission (DTX) shall be used even when UE is in connected mode. The purpose of DRX/DTX is to save the UE battery consumption.

In order to complete the HARQ process as quickly as possible, the UE shall enter into continuous reception mode (i.e. non DRX) after the reception of the first HARQ PDU or packet. This means UE should be able to continuously monitor any control signalling and/or packet just after it has received the first packet.

As explained above the S-HARQ operation requires fixed timing between the first transmission and retransmission or between the retransmissions, and for the asynchronous HARQ the time of the retransmission is determined by the scheduler. But for both, asynchronous and synchronous HARQ, it is assumed that the ACK/NACK signalling is synchronous. The major problem arises when MU-MIMO is used with HARQ. MU-MIMO transmission requires the fulfillment of the orthogonality conditions between the scheduled users. Since orthogonality conditions may not be fulfilled for all the active users, i.e. users whose HARQ protocol is in operation. This will lead to a situation where the ACK/NACK or any other relevant control information is not received by the transmitter from the receiver within the due course. This will eventually delay the retransmission beyond the stipulated time, thus collapsing the HARQ operation.

To summarize, in case of UL HARQ, e.g. S-HARQ and DL MU-MIMO, which is more relevant scenario with respective to the standard, the following problem will occur: The network may not be able to send ACK/NACK to all users at a fixed (standardized) time as required by S-HARQ.

In case of DL HARQ, e.g. S-HARQ and UL MU-MIMO the following problems will occur:—

The network may not be able to schedule all users to send ACK/NACK to the base station at a fixed (standardized) time.

All users may not be able to feed back downlink channel state information such as channel quality indicator (CQI), code book etc to the base station at a fixed (standardized) time.

SUMMARY OF THE INVENTION

According to a first aspect of the present invention, there is provided a method in a radio base station in a cellular radio communication network, where HARQ is used for the error control, the method comprising:

varying the transmitted timings of the HARQ feedback signaling and/or relevant information such that users with orthogonal pre-coding vectors (W) are scheduled simultaneously to reduce multi-user interference and said signalling is received by a transmitter before the start of the next retransmission, allocating or signaling a user equipment a time within which a user equipment is to transmit the HARQ feedback signaling and/or said relevant information, and detecting said HARQ feedback signaling and/or said relevant information sent by the user equipment within the allocated time duration.

According to a first aspect of the present invention, there is provided a method in a user equipment for use in a cellular radio communication network where HARQ is used for the error control, the method comprising:

receiving a timing at which the uplink HARQ feedback signalling and/or relevant information is to be sent to the said base station, transmitting the uplink HARQ feedback or other relevant signaling according to the allocating, and detecting the reception of downlink HARQ feedback signaling and/or said relevant information that could be sent by the base station at any arbitrary time between the transmission and the retransmission or between successive retransmissions.

Thus, in embodiments of the invention, some of the following advantages may be obtained:—

The orthogonal conditions required by MU-MIMO are satisfied.

Multi-user interference is reduced and MU-MIMO gain is retained.

Base station determines the tight time for each UE to send ACK/NACK. This could be done via uplink scheduling signaling It is easy to satisfy orthogonal transmission conditions this would require more processing at the base station if ACK/NACK are to be received from many UE.

This solution works well for slow pre-coding during the transmission time T1, i.e. time between transmission and retransmission. This is because the base station needs to know the pre-coding vectors of the UE in both uplink and downlink.

Both base station and UE may contribute to satisfy the timing conditions, i.e. either transmitter timing (T2) or receiver feedback timing/(T2) could be adjusted while satisfying: T1>T2+T3.

UE has some flexibility to determine when to send.

It is suitable for fast pre-coding during transmission time T1

Pre-coding vector for some UE can vary during T1

BRIEF DESCRIPTION OF THE DRAWINGS

In the following the invention is described with reference to non-limiting drawings in which.

DETAILED DESCRIPTION OF PREFERRED EMBODIMENTS

Figure 4:
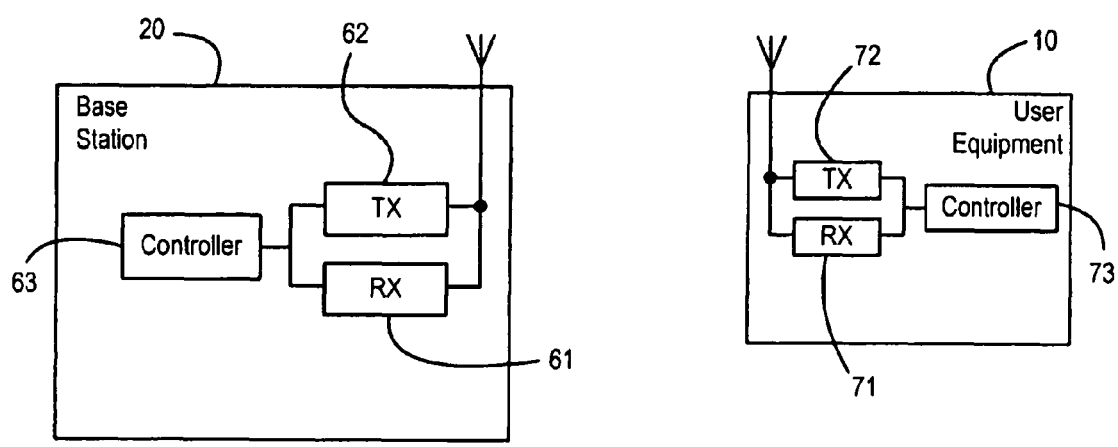
FIG. 4 illustrates a mobile communications system in accordance with the present invention.

FIG. 4 illustrates a part of a mobile communications network in accordance with an aspect of the present invention.

Specifically, FIG. 4 illustrates a user equipment (UE) 10 located in the coverage area of a radio base station 20. As is well known, the user equipment 10 is able to receive signals from the base station 20.

The general form of a user equipment and a base station will be well known to the person skilled in the art, and these will not be described in detail, and FIG. 4 shows only the parts of the user equipment 10 and the base station that are necessary for an explanation of the present invention.

Specifically, the user equipment 10 includes receiver circuitry (RX) 71 for receiving signals from the base station 20, and transmit circuitry (TX) 72 for transmitting signals to the base station, with the receiver circuitry 71 and transmit circuitry 72 both operating under the control of a controller 73.

Similarly, the base station 20 includes receiver circuitry (RX) 61 for receiving signals from the user equipment 10, and transmit circuitry (TX) 62 for transmitting signals to the user equipment 10, with the receiver circuitry 61 and transmit circuitry 62 both operating under the control of a controller 63.

The base station 20 is adopted for use in a network for receiving data using multiple transmit antennas in a multiple input multiple output (MIMO) transmission scenario, where more than one user can be scheduled simultaneously using the same physical resources but on different beams.

However, the invention is not limited to MIMO, but may be employed in other systems, such as Single Input Multiple Output (SIMO), Multiple Input Single Output (MISO), etc. In general, the invention is applicable to any case where physical resources, especially non-orthogonal physical resources, are shared between multiple users.

The network operates in accordance with a mobile communications standard, ensuring that the base station transmits data in a format that can be detected by the user equipment. In the described embodiment, the network is an E-UTRAN (Extended UMTS Terrestrial Radio Access Network) network. However, the invention is also applicable to other communications standards such as WiMAX.

In the illustrated embodiments, when MU-MIMO is used in conjunction with HARQ then HARQ ACK/NACK feedback signalling (i.e. ACK/NACK) is to be received by the transmitter at any time before sending the retransmission.

Thus the durations of receiving HARQ packet (T2) at the receiver and/or duration after which the receiver sends ACK/NACK to the transmitter (T3) are to be varied. The variable timing provides flexibility of achieving orthogonality conditions required by the MU-MIMO, without disrupting the HARQ operation.

The duration limit of the HARQ should be satisfied even though T2 and T3 are varied, i.e. T2+T3<T1, where T1 is the time after which the packet is retransmitted.

The timing adjustment depends on whether HARQ is used in the uplink direction or in the downlink direction as described further.

Figure 1:
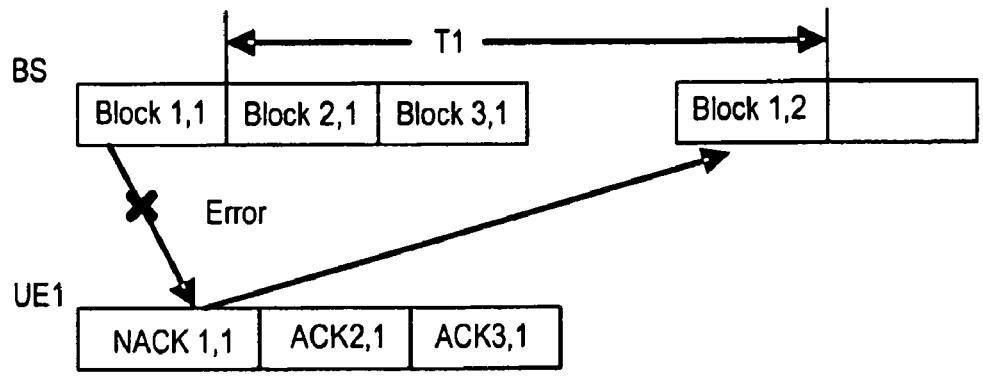
FIG. 1 illustrates synchronous HARQ protocol operation.
Figure 2:
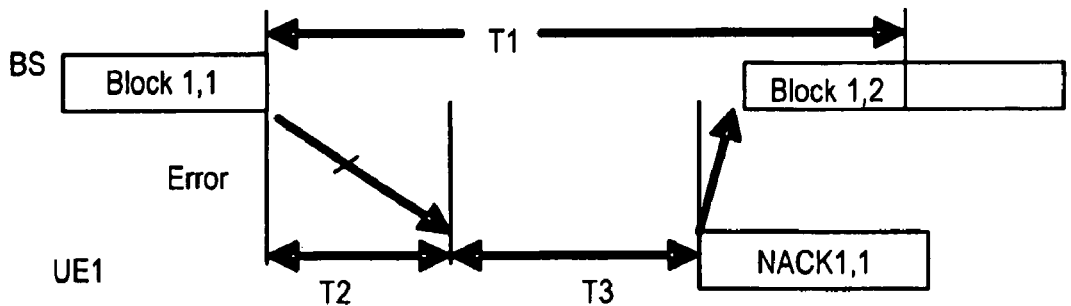
FIG. 2 illustrates downlink synchronous HARQ protocol operation.

As mentioned above, FIG. 2 shows the use of HARQ when data is being transmitted in the downlink. The packets (Block 1.1) are transmitted by the base station BS and the acknowledgement (ACK) and negative acknowledgement (NACK) messages are sent by the user equipment UE1, together with any other feedback such as CQI and code book information.

There is a fixed retransmission duration, indicated by T1 in FIG. 5. The time taken for the UE to receive an HARQ protocol data unit (PDU) from the BS is indicated by T2 in FIG. 3, and T3 indicates the duration of downlink scheduling (for ACK/NACK).

In this case there are two possible solutions, referred to herein as a tight timing solution and a loose timing solution.

In the case of the tight timing solution, the timing of the messages is determined by the network.

Specifically, in this solution, the UE sends ACK/NACK at a determined time T3' (T3'≦T3), where T3' is not standardized, but instead is dynamically set by the base station via scheduling of the uplink.

The base station knows the weighting vectors (both uplink and downlink) of the UE to be scheduled, and the base station can therefore decide when the UE should send the ACK/NACK messages, to avoid a collision with other UEs.

The UE can also send other feedback information e.g. CQI, code book with ACK/NACK at the base station determined timing, T3'.

The timing T3' can be signalled by the base station to the UE separately with every data packet, or an initial timing T3' can be signalled by the base station to the UE, and that initial timing can then be used by the UE until or unless it is varied for any particular data packet.

This solution works well for fixed pre-coding for UEs during the time T1, i.e. time between transmission and retransmission.

In the case of the loose timing solution, the timing of the messages is determined by the UE.

In this solution the UE could send ACK/NACK at any time T3' within [0, T3], where the base station assigns uplink resources for ACK/NACK, which are valid over [0, T3]. The base station can also tell the UE the loose time duration T3'. Another possibility is that the base station tells UE the time of the reception of the transmission i.e. T2 and the UE calculates the duration T3 to send ACK/NACK, T3=T1−T2.

In any case UE decides when to send ACK/NACK but within the duration T3. As before, the UE can also send other feedback information e.g. CQI, code book with together with ACK/NACK.

This solution works well for varied pre-coding for UEs during the time T1.

This solution will require the base station to listen to the UE feedback over the duration [0 T3].

Figure 3:
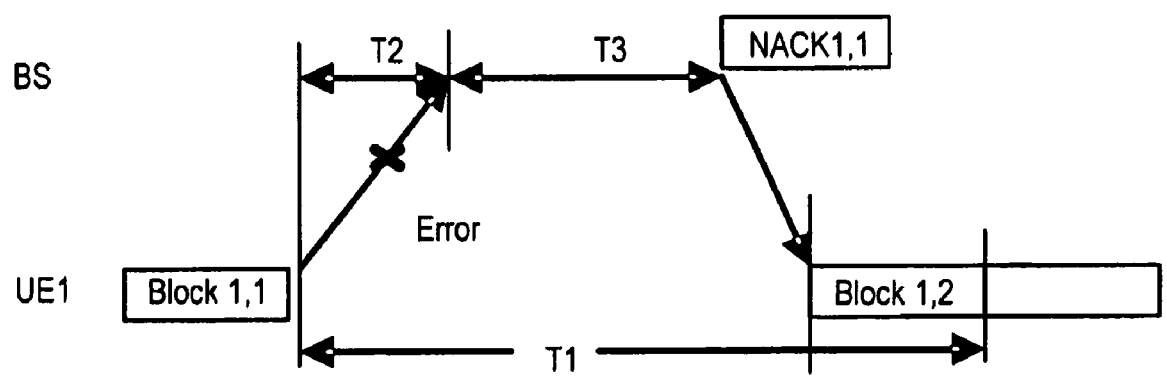
FIG. 3 illustrates uplink synchronous HARQ protocol operation.

FIG. 3 illustrates the operation of the invention in the case of the uplink synchronous HARQ protocol, i.e. where the packets (Block 1.1) are transmitted by the user equipment UE1 and the acknowledgement (ACK) and negative acknowledgement (NACK) messages are sent by the base station BS on the downlink control channel.

There is a fixed retransmission duration, indicated by T1 in FIG. 3. The time taken for BS to receive an HARQ protocol data unit (PDU) from UE1 is indicated by T2 in FIG. 3, and T3 indicates the duration of downlink scheduling (for ACK/NACK) to UE1. In this scenario the UE sends packets and the base station sends the ACK/NACK. In this case, since ACK/NACK is sent by the base station, a loose timing solution is used.

In this solution, the base station sends ACK/NACK at any time T3' within [0, T3]. This time T3' is determined by the base station based on the downlink orthogonal conditions due to MU-MIMO.

For example, the base station will send the ACK/NACK to the UE within [0, T3] as soon as the orthogonal condition is satisfied. This would require that UE continuously listens to the downlink control channel, which carries ACK/NACK. However, this requirement could be made less onerous for the UE if the base station announced in advance a subrange of the time period [0, T3] within which it would send the ACK/NACK message. For example, the base station could announce in advance whether it will send the ACK/NACK in the time period [0, T3/2], or in the time period [T3/2, T3].

The UE goes to continuous reception (non DRX) mode after first HARQ PDU reception irrespective of the service (i.e. also for VoIP). Thus it would be possible for the UE to track the downlink control channel containing the ACK/NACK that could be sent at any sub-frame.

Thus, in these embodiments of the invention, the base station can vary a transmitted timing of HARQ feedback signalling and/or other necessary information, such that only users with orthogonal pre-coding vectors (W) are scheduled simultaneously, in order to reduce multi-user interference and to ensure that said feedback signalling is received by the transmitter before the start of the next retransmission.

The invention claimed is:

1. A method in a radio base station in a cellular radio communication network, where HARQ is used for the error control, the method comprising:
   varying the transmitted timings of the HARQ feedback signaling and/or relevant information such that users with orthogonal pre-coding vectors (W) are scheduled simultaneously to reduce multi-user interference and said signaling is received by a transmitter before the start of the next retransmission,
   allocating or signaling a user equipment a time within which a user equipment is to transmit the HARQ feedback signaling and/or said relevant information, and
   detecting said HARQ feedback signaling and/or said relevant information sent by the user equipment within the allocated time duration.

2. The method according to claim 1, wherein a HARQ protocol used in an uplink or in a downlink or in both uplink and downlink is synchronous HARQ, where there is fixed time between the transmission and retransmission or between successive transmissions.

3. The method according to claim 1, wherein a HARQ protocol used in the uplink or in the downlink or in both uplink and downlink is asynchronous HARQ, where there is no fixed time between transmission and retransmission or between successive retransmissions.

4. The method according to claim 1, wherein the HARQ transmission takes place in the downlink and the HARQ feedback signalling is sent by the user equipment in the uplink.

5. The method according to claim 4, wherein the HARQ feedback signaling is sent by the user equipment at a time instance ($T_0$), which is dynamically allocated by the base station.

6. The method according to claim 5, wherein the HARQ feedback signaling comprises of HARQ acknowledgement (ACK) or negative acknowledgement (NACK) of the received HARQ transmission or retransmission.

7. The method according to claim 6, wherein the base station detects the HARQ feedback signaling or other relevant Information sent by the user equipment.

8. The method according to claim 7, wherein the HARQ feedback signaling comprises of HARQ acknowledgement (ACK) or negative acknowledgement (NACK) of the received HARQ transmission or retransmission.

9. The method according to claim 5, wherein the HARQ feedback signaling or other relevant information comprises of downlink channel state information such as channel quality indicator or code book.

10. The method according to claim 4, wherein the HARQ feedback is sent by a user equipment at any time instance within duration $\delta T_0'$, where $\delta T_0'$ is dynamically allocated by the base station.

11. The method according to claim 1, wherein the HARQ transmission takes place in the uplink and the HARQ feedback is sent by the base station in the downlink.

12. The method according to claim 11, wherein the HARQ feedback is sent by the base station equipment at any time instance within duration $\delta T0''$, where $\delta T0''$ is set by the said base station.

13. A method in a user equipment for use in a cellular radio communication network where HARQ is used for the error control, the method comprising:
   receiving a timing at which the uplink HARQ feedback signaling and/or relevant information is to be sent to the said base station,
   transmitting the uplink HARQ feedback or other relevant signaling according to the allocating,
   detecting the reception of downlink HARQ feedback signaling and/or said relevant information that could be sent by the base station at any arbitrary time between the transmission and the retransmission or between successive retransmissions, and
   wherein more than one user can be scheduled simultaneously using the same physical resources but on different beams.

14. The method according to claim 13, wherein the HARQ protocol used in the uplink or in the downlink or in both uplink and downlink is synchronous HARQ, where there is fixed time between the transmission and retransmission or between successive retransmissions.

15. The method according to claim 13, wherein the HARQ protocol used in the uplink or in the downlink or in both uplink and downlink is asynchronous HARQ, where there is no fixed time between transmission and retransmission or between successive retransmissions.

16. A radio base station for use in a cellular radio communication network, where HARQ is used for the error control, said base station comprising:
   means for varying a transmitted timing of HARQ feedback signaling and/or a necessary information such that users with orthogonal pre-coding vectors (W) are scheduled simultaneously to reduce multi-user interference and said signaling is received by the transmitter before the start of the next retransmission, means for allocating or signaling the user equipment a time within which a user equipment is to transmit the HARQ feedback signaling and/or said relevant information, and means for detecting said HARQ feedback signaling and/or said relevant information sent by the user equipment within the allocated time duration.

17. The base station of claim 16, adopted for use in a network for receiving data using multiple transmit antennas in a multiple input multiple output (MIMO) transmission scenario, where more than one user can be scheduled simultaneously using the same physical resources but on different beams.

18. A user equipment in a cellular radio communication network where HARQ is used for error control, the user equipment comprising:
   a receiver for receiving from a base station a timing at which a uplink HARQ feedback signaling and/or a relevant information is to be sent,
   a transmitter for transmitting said uplink HARQ feedback and/or said relevant signaling according to a allocating timing,
   means for detecting reception of downlink HARQ feedback signaling and/or said relevant information, which can be sent by a base station at any arbitrary time between the transmission and the retransmission or between successive retransmissions, and
   wherein more than one user can be scheduled simultaneously using the same physical resources but on different beams.

19. A method of receiving data from a transmitting device in a receiving device, the method comprising:
   attempting to receive the transmitted data;
   dynamically selecting a dynamically selectable time in said receiving device from within a range signaled to the receiving device from the transmitting device; and
   sending an ACK/NACK message at said dynamically selectable time.

20. A method as claimed in claim 19, wherein the receiving device is a user equipment in a cellular communications network.

21. A method as claimed in claim 19, wherein the transmitting device is a radio base station in a cellular communications network.

22. A method as claimed in claim 19, wherein the receiving device is receiving data from a plurality of transmitting devices using shared non-orthogonal resources, the method comprising dynamically selecting said dynamically selectable time in said receiving device, such that it is possible to send ACK/NACK messages to said plurality of transmitting devices on the shared resources.

23. A method as claimed in claim 22, wherein the receiving device preselects a timing range, and dynamically selects said dynamically selectable time from within said timing range.

24. A method as claimed in claim 22, wherein the transmitting device is a user equipment in a cellular communications network.

25. A method as claimed in claim 22, wherein the receiving device is a radio base station in a cellular communications network.

26. A receiving device, adapted to:
   attempt to receive transmitted data from a transmitting device; and
   send an ACK/NACK message at a dynamically selectable time, wherein the receiving device is adapted to dynamically select said dynamically selectable time.

27. A receiving device as claimed in claim 26, adapted to dynamically select said dynamically selectable time from within a range signaled to the receiving device from the transmitting device.

28. A receiving device as claimed in claim 26, wherein the receiving device is a user equipment in a cellular communications network.

29. A receiving device as claimed in claim 26, wherein the receiving device is receiving data from a plurality of transmitting devices using shared non-orthogonal resources, the receiving device being adapted to dynamically select said dynamically selectable time, such that it is possible to send ACK/NACK messages to said plurality of transmitting devices on the shared resources.

30. A receiving device as claimed in claim 29, wherein the receiving device is adapted to preselect a timing range, and to dynamically select said dynamically selectable time from within said timing range.

31. A receiving device as claimed in claim 30, wherein the receiving device is a radio base station in a cellular communications network.

32. A method in a radio base station In a cellular radio communication network, where HARQ is used for the error control, the method comprising:
   varying the transmitted timings of the HARQ feedback signaling and/or relevant information such that users with orthogonal pre-coding vectors (W) are scheduled simultaneously to reduce multi-user interference and said signaling is received by a transmitter before the start of the next retransmission,
   allocating or signaling a user equipment a time within which a user equipment is to transmit the HARQ feedback signaling and/or said relevant information, and
   detecting said HARQ feedback signaling and/or said relevant information sent by the user equipment within the allocated time duration,
   wherein the HARQ transmission takes place in the downlink and the HARQ feedback signaling is sent by the user equipment in the uplink at a time instance ($T_0$), which is dynamically allocated by the base station.

33. A method in a radio base station In a cellular radio communication network, where HARQ is used for the error control, the method comprising:
   varying the transmitted timings of the HARQ feedback signaling and/or relevant information such that users with orthogonal pre-coding vectors (W) are scheduled simultaneously to reduce multi-user interference and said signaling is received by a transmitter before the start of the next retransmission,
   allocating or signaling a user equipment a time within which a user equipment is to transmit the HARQ feedback signaling and/or said relevant information, and
   detecting said HARQ feedback signaling and/or said relevant information sent by the user equipment within the allocated time duration,
   wherein the HARQ transmission takes place in the uplink and the HARQ feedback is sent by the base station in the downlink at any time instance within duration $\delta T0''$, where $\delta T0''$ is set by the said base station.

* * * * *